United States Patent
Kim

(10) Patent No.: US 9,499,373 B1
(45) Date of Patent: Nov. 22, 2016

(54) CABLE RETRACTION UNIT ASSEMBLY

(71) Applicant: Kum Oh Electronics CO., LTD., Bucheon-si (KR)

(72) Inventor: Ki Sang Kim, Bucheon-si (KR)

(73) Assignee: KUM OH ELECTRONICS CO., LTD. (KR)

( * ) Notice: Subject to any disclaimer, the term of this patent is extended or adjusted under 35 U.S.C. 154(b) by 0 days.

(21) Appl. No.: 15/136,071

(22) Filed: Apr. 22, 2016

(30) Foreign Application Priority Data

Jun. 18, 2015 (KR) ........................ 10-2015-0086452

(51) Int. Cl.
*B65H 75/00* (2006.01)
*B65H 75/44* (2006.01)

(52) U.S. Cl.
CPC ...... *B65H 75/4402* (2013.01); *B65H 75/4428* (2013.01); *B65H 75/4471* (2013.01); *B65H 2701/3919* (2013.01)

(58) Field of Classification Search
CPC .......... B65H 75/4402; B65H 75/4428; B65H 75/4471
USPC ..................................... 191/12 R, 12.2 R, 14
See application file for complete search history.

(56) References Cited

U.S. PATENT DOCUMENTS

| | | | | |
|---|---|---|---|---|
| 3,854,017 | A * | 12/1974 | Crim ...................... | H02G 11/02 137/355.23 |
| 5,700,158 | A * | 12/1997 | Neiser .................. | H01R 13/641 439/373 |
| 6,515,229 | B2 * | 2/2003 | Aoki ................... | B60R 16/0215 174/69 |
| 8,558,688 | B2 * | 10/2013 | Henson ................. | G06F 1/1626 340/539.1 |
| 9,327,938 | B2 * | 5/2016 | Wilson ............... | B65H 75/4402 |
| 2003/0226927 | A1 * | 12/2003 | Van Dine ............. | B65H 75/364 242/360 |
| 2006/0054728 | A1 * | 3/2006 | Gallego ................... | B60D 1/62 242/378.1 |
| 2006/0057863 | A1 * | 3/2006 | Araki .................... | B60R 16/027 439/15 |
| 2009/0168383 | A1 * | 7/2009 | Goto ..................... | G06F 1/1616 361/790 |
| 2011/0024543 | A1 * | 2/2011 | Smrha .................... | B65H 75/38 242/377 |
| 2012/0025002 | A1 * | 2/2012 | Zink .................... | B65H 75/403 242/390.2 |
| 2012/0312651 | A1 * | 12/2012 | Kramer .................. | H02G 11/02 191/12.2 R |
| 2013/0344706 | A1 * | 12/2013 | Sato ...................... | B60R 16/037 439/15 |
| 2014/0011374 | A1 * | 1/2014 | Adachi ................ | H01R 35/025 439/13 |
| 2014/0224913 | A1 * | 8/2014 | Wilson ............... | B65H 75/4402 242/378 |
| 2014/0224914 | A1 * | 8/2014 | Sugiura .................. | B65H 75/48 242/379 |
| 2016/0100041 | A1 * | 4/2016 | Kim ....................... | H02G 3/185 455/557 |

FOREIGN PATENT DOCUMENTS

| | | |
|---|---|---|
| JP | 5110089 | 10/2012 |
| KR | 100433005 | 5/2004 |
| KR | 20090123334 | 12/2009 |
| KR | 20130107782 | 10/2013 |
| KR | 200472989 | 5/2014 |
| KR | 101417707 | 7/2014 |
| WO | 2009088542 | 7/2009 |

* cited by examiner

*Primary Examiner* — Jason C Smith
(74) *Attorney, Agent, or Firm* — Cantor Colburn LLP

(57) ABSTRACT

Provided is a cable retraction unit assembly connected to a table for displaying a mobile device. The cable retraction unit assembly includes: a cable connected to a mobile device; a guide housing and a withdrawal unit respectively mounted to an upper portion and a lower portion of a table, with the cable penetrating through the guide housing and the withdrawal unit; and a guide unit rotatably provided within the guide housing, wherein the guide unit is configured to rotate in response to a rotating direction of the cable when the cable rotates, thereby being capable of preventing twisting or breaking of the cable.

2 Claims, 12 Drawing Sheets

CABLE RETRACTION UNIT ASSEMBLY

CROSS REFERENCE TO RELATED APPLICATION

The present application claims priority to Korean Patent Application No. 10-2015-0086452, filed Jun. 18, 2015, the entire contents of which is incorporated herein for all purposes by this reference.

BACKGROUND OF THE INVENTION

Field of the Invention

The present invention relates generally to a cable retraction unit assembly that is connected to a table for displaying a mobile device. More particularly, the present invention relates to a cable retraction unit assembly including: a cable connected to a mobile device; a guide housing and a withdrawal unit respectively mounted to an upper portion and a lower portion of a tabletop, with the cable penetrating through the guide housing and the withdrawal unit; and a guide unit rotatably provided within the guide housing, wherein the guide unit is configured to rotate in response to a rotating direction of the cable when the cable rotates, thereby being capable of preventing twisting or breaking of the cable.

Description of the Related Art

Generally, when goods such as mobile devices and the like are displayed, a main cable is connected to an anti-theft device for security and the main cable is connected to a cable that is connected to a product. Thereby, when the cable is disconnected from the product, the anti-theft device receives a disconnection signal and then an alarm sounds. Here, for the convenience of displaying goods, there is provided an extendable cable that is configured to be arranged when displaying goods. There is further provided a means for winding the cable. Further, this kind of device may be used for sending data or charging the product when the device is connected to an external power supply while not being connected to a main cable nor to an anti-theft device.

As the first document of related art, Korean Patent Application Publication No. 10-2013-0107782 discloses "Burglar alarm device and cable for displaying goods".

The burglar alarm device and cable for displaying goods includes: an attachment unit attached to a product; a sensor provided at a junction between the attachment unit and the product for detecting a state of attachment of the product; at least one indication lamp mounted to a portion of the attachment unit; and a cable including a connector, a sensor line formed by connecting the sensor and the connector together, and a power line for connecting the indication lamp and the connector together.

However, the burglar alarm device and cable for displaying goods is problematic in that it is impossible to extend or to arrange the cable between the attachment unit for attaching a product thereto and a control unit, thereby causing inconvenience to a user who wishes to examine the demonstrated product.

Thus, in order to solve the above mentioned problem, technologies for winding and arranging a cable have been disclosed.

As the second document of related art, Korean Utility Model Registration No. 20-0472989 discloses "Earphone unit having strap-type cable".

The earphone unit having strap-type cable includes: a connection terminal detachably mounted to an earphone terminal of a mobile terminal; a base having a predetermined width in a lengthwise transverse direction so as to have a thin strap shape; a plurality of conducting wires for transferring data along a longitudinal direction of the base; a strap-type cable being connected to the connection terminal at one end of the cable and transferring a voice signal; earphones being connected to the cable at the other end of the cable; and a housing receiving the cable therein, provided with a terminal locking member at one end of the housing for locking and unlocking an end of the connection terminal, and provided with an earphone locking member at the other end of the housing for locking and unlocking each of the earphones.

The earphone unit having strap-type cable uses a FPCB (Flexible Printed Circuit Board) for the earphone cable to prevent twisting of the cable. However, the conventional art is problematic in that when the earphones are extended from the housing, a first cable and a second cable, which are connected to the housing, may twist or be broken.

Further, as the third document of related art, Korean Patent No. 10-1417707 discloses "Earphone integrated type portable terminal case".

The earphone integrated type portable terminal case includes: a case body that is combined with a portable terminal at one side and forms an accommodating space inside; multiple earphone winding parts that are supported in a state capable of a restorable rotation in the accommodating space of the case body; an earphone connection circuit part that includes multiple rotation connection terminals formed in a concentric circle in one side of the earphone winding parts, multiple fixed connection terminals formed in the inner surface of the case body in a state of being arranged on the rotation trace of the rotation connection terminals, and multiple wiring parts formed in the inner side of the case body in a state of electrically connecting the fixed connection terminals; and an earphone that has an earphone cable of each earphone head individually wound on the multiple earphone winding parts in a state of exposing the earphone heads to the outside of the case body, has an end of the earphone cable connected to the rotation connection terminals of the earphone connection circuit part, enables the earphone cable to be drawn from the case body when external force of a direction separated from the earphone winding parts acts on the earphone heads, enables the earphone cable to be wound according to the restoration operation of the earphone winding parts when the external force dissipates.

However, the earphone integrated type portable terminal case is problematic in that rotations by the multiple rotation connection terminals must still allow electrical connection, whereby a structure is complicated and it is difficult to electrically connect the terminals when not in place.

Further, as the fourth document of related art, Korean Patent No. 10-0433005 discloses "Apparatus for arranging cable".

The apparatus for arranging cable includes: a shell-shaped upper body having an accommodation space for receiving an upper cable therein; a shell-shaped lower body with cable locking grooves provided at an end thereof, the cable locking groove formed to fit the cable, and having an accommodation space for receiving a lower cable therein; an elliptical spindle connecting the upper body and the lower body to be fixed and spaced apart from each other while an edge of the upper body faces an edge of the lower body, and the spindle being capable of drawing and winding the cable; an anti-separation protrusion provided at the edge of each of the upper body and the lower body by protruding toward inside.

However, the apparatus for arranging a cable is problematic in that the apparatus is for winding and arranging one cable, and is configured such that the main body is disposed in the middle of the cable, whereby when the cable is extended, the main body is located in the middle of the cable, causing inconvenience.

DOCUMENTS OF RELATED ART (Patent Document 1) Korean Patent Application Publication No. 10-2013-0107782;
(Patent Document 2) Korean Utility Model Registration No. 20-0472989;
(Patent Document 3) Korean Patent No. 10-1417707; and
(Patent Document 4) Korean Patent No. 10-0433005.

SUMMARY OF THE INVENTION

Accordingly, the present invention has been made keeping in mind the above problems occurring in the related art, and the present invention is intended to propose a cable retraction unit assembly including: a cable connected to a mobile device; and a guide housing and a withdrawal unit respectively mounted to an upper portion and a lower portion of a table, with the cable penetrating through the guide housing and the withdrawal unit, wherein the cable retraction unit assembly is capable of freely rotating regardless of a rotating direction when the cable is retracted or extended via a guide unit that is rotatably provided in the guide housing.

The present invention is further intended to propose a cable retraction unit assembly configured such that the guide unit includes a locking unit, a rotor provided within the locking unit, and ball bearings allowing the rotor to be rotated, so as not to be restricted by a rotating direction, whereby the cable is easily rotated, and thus the mobile device can be freely handled.

The present invention is further intended to propose a cable retraction unit assembly configured such that at least one of the guide unit and the withdrawal guide is provided with a roller, thereby being capable of allowing the cable to be smoothly retracted and extended.

The present invention is further intended to propose a cable retraction unit assembly configured such that the guide housing and the withdrawal unit are coupled to each other by using a locking bolt, with a gap defined therebetween, thereby being capable of coupling the guide housing and the withdrawal unit by adjusting a length of the locking bolt depending on a thickness of the table.

In order to achieve the above object, according to one aspect of the present invention, there is provided a cable retraction unit assembly.

The cable retraction unit assembly includes: a cable connected to a mobile device; a guide housing mounted to an upper portion of a main hole provided in a table, with the cable penetrating through the guide housing; a guide unit provided within the guide housing for passing the cable therethrough, the guide unit being configured to rotate in response to a rotating direction of the cable; and a withdrawal unit provided at a lower portion of the main hole, the withdrawal unit including a withdrawal guide for inducing retraction and extension of the cable, and a recoiler connected to the withdrawal guide so as to wind the cable, wherein the guide unit may include: a locking unit; a rotor provided within the locking unit; and a plurality ball bearings provided in the rotor plural and inducing a rotation of the rotor in the locking unit.

The cable retraction unit assembly according to the present invention includes: the cable connected to the mobile device; the guide housing and the withdrawal unit respectively mounted to the upper portion and the lower portion of the table, with the cable penetrating through the guide housing and the withdrawal unit; and a guide unit rotatably provided within the guide housing, whereby when a viewer manipulates the mobile device, it is possible to prevent twisting or breaking of the cable because the guide unit rotates in response to a rotation of the cable in accordance with a direction of the mobile device, and it is possible to allow the viewer to manipulate the mobile device without resistance by frictional force.

Further, the guide unit includes the locking unit, the rotor, and the ball bearings that induce a rotation of the rotor, whereby when the rotor rotates in the locking unit, it is possible to allow the rotor to smoothly rotate by a rotation of the ball bearings, and it is possible to reduce the frictional force generated by the rotation of the rotor, thus allowing the viewer use the mobile device easily.

Further, at least one of the guide unit and the withdrawal guide is provided with the roller, whereby the roller rotates when the cable is retracted and extended, and thus it is possible to prevent breaking of the cable by reducing the frictional force generated when the cable is retracted and extended, thereby being capable of improving durability.

Further, the guide housing and the withdrawal unit are coupled to each other by using a locking bolt, with a gap defined therebetween, thereby being capable of coupling the guide housing and the withdrawal unit by adjusting a length of the locking bolt depending on a thickness of the table, and thus it is possible to couple the guide housing and the withdrawal unit regardless of the thickness of the table, thereby improving generality.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
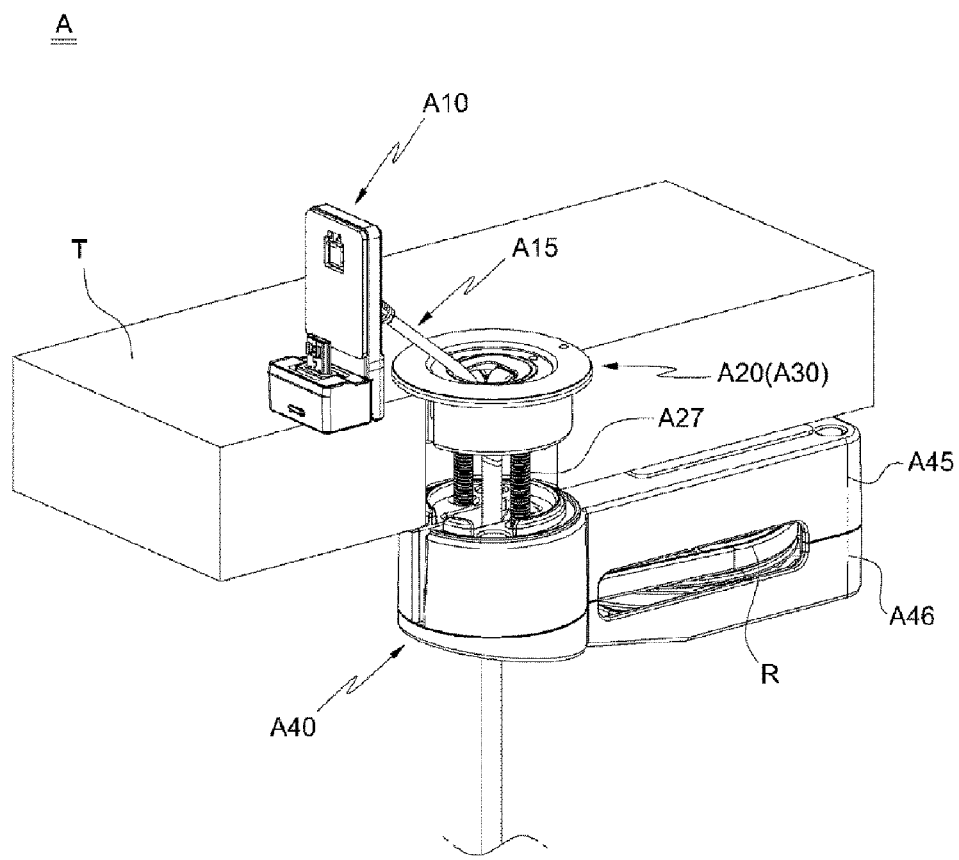
FIG. 1 is a perspective view illustrating a cable retraction unit assembly according to the present invention.

Hereinbelow, exemplary embodiments of the present invention will be described in detail with reference to the accompanying drawings.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, tens and units, or reference numerals having like tens, units and letters refer to like elements having like functions throughout, and unless the context clearly indicates otherwise, elements referred to by reference numerals of the drawings should be understood based on this standard.

Also, for convenience of understanding the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
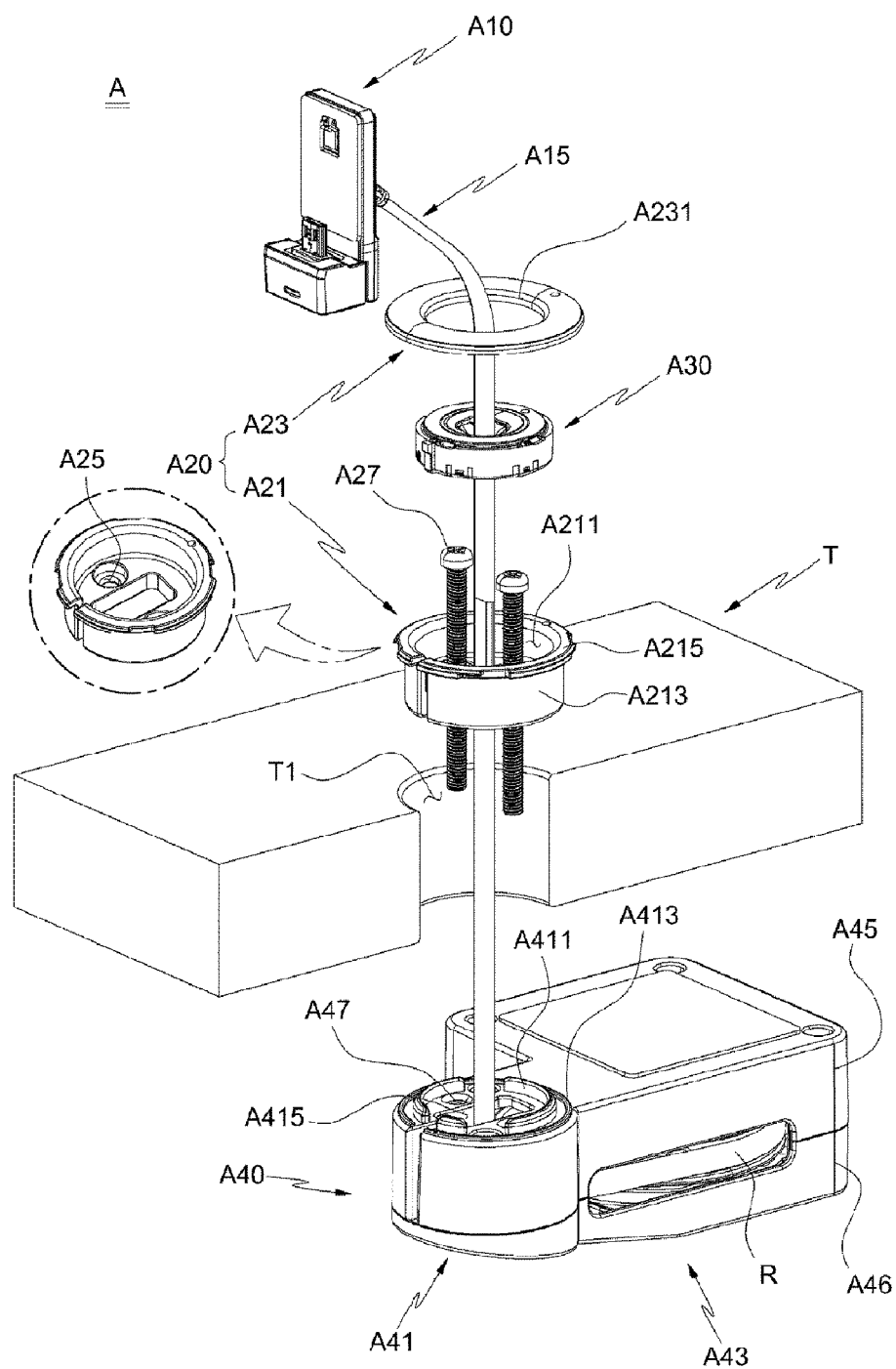
FIG. 2 is an exploded perspective view illustrating the cable retraction unit assembly according to the present invention.

As shown in FIGS. 1 and 2, a cable retraction unit assembly A according to the present invention includes: a cable 15 connected to a mobile device A10; a guide housing A20 and a withdrawal unit A40 respectively mounted to an upper portion and a lower portion of a table T, with the cable penetrating through the guide housing and the withdrawal unit; and a guide unit A30 rotatably provided in the guide housing A20.

Hereinbelow, reference will be made in greater detail to each configuration of the present invention, with reference to the accompanying drawings.

The assembly is configured such that: the table T for displaying the mobile device A10 is provided with a main hole T1; the mobile device A10 is connected with the cable 15; and an end of the cable 15 is connected with an additional anti-theft device, wherein when the mobile device A10 is disconnected from the cable 15, alarm sounds via the anti-theft device.

The cable 15 for being connected to the mobile device A10 is provided, and the guide housing A20 and the withdrawal unit A40, through which the cable 15 penetrates, are respectively provided at an upper portion and a lower portion of the table T.

The cable 15 is configured to penetrate through the main hole T1 of the table T such that the mobile device A10 protrudes above the table T.

Here, the guide housing A20 and a guide unit A30 provided in the guide housing A20 are provided in the upper portion of the table T, namely an upper portion of the main hole T1, so as to penetrate through the table T.

The guide housing A20 includes: a guide holder A21 with an insertion unit A211 provided therein for allowing the guide unit A30 to be connected; and a guide cover A23 for covering the insertion unit A211 of the guide holder A21.

The guide holder A21 is provided in the upper portion of the main hole T1 of the table T, and includes: an outer wall A213 partially inserted into the upper portion of the main hole T1; and a flange A215 bent from the outer wall A213 toward outside so as to support an upper surface of the table T. Thus, the guide holder A21 is insertedly coupled to the upper portion of the main hole T1 of the table T, and is prevented from falling out of the main hole T1 by the flange A215.

Further, the guide holder A21 is coupled with the guide cover A23 for covering the insertion unit A211 of the guide holder A21, wherein the guide holder A21 is in a donut shape so as to allow the cable 15 to penetrate therethrough, and the guide cover A23 is provided with a chamfer A231 having a gradually sloping edge at an inner circumferential surface thereof so as to be capable of preventing the cable 15 from being broken when the cable is retracted or extended.

Further, the table T is further provided with the withdrawal unit A40 at the lower portion thereof for retracting and extending the cable 15, wherein the withdrawal unit A40 includes: a withdrawal guide A41 for inducing retracting and extending of the cable 15, and a recoiler R connected to the withdrawal guide A41 so as to wind the cable 15.

To be more specific, the withdrawal unit A40 includes a lower body A46 and an upper body A45 coupled to the lower body A46, wherein the body (the upper body A45 and the lower body A46) includes the withdrawal guide A41 and a recoiler seat A43 for allowing the recoiler R for winding the cable 15 by being connected to the withdrawal guide A41 to be received therein.

Hereinbelow, reference will be made in greater detail to the recoiler R.

In other words, the withdrawal unit A40 is provided at the lower portion of the tabletop T, and the upper body A45 is contacted with a lower surface of the tabletop T. To be more specific, the withdrawal guide A41 of the upper body A45 includes: an inner support protrusion A411 protruding upward; and an outer support protrusion A413 provided outside the inner support protrusion A411 and being spaced apart from the support protrusion A411.

The support protrusion is configured to come into contact with a lower edge of the main hole T1, wherein either the inner support protrusion A411 or the outer support protrusion A413 is locked to the lower portion of the main hole T1 depending on a size of the main hole T1. Thus, the withdrawal guide A41 of the upper body A45 is configured to be disposed at a location where the withdrawal guide A41 communicates with the main hole T1, and is configured to be prevented from shaking or falling out of the main hole T1 by the support protrusion.

Further, the withdrawal guide A41 of the upper body A45 is provided with a movement hole A415 such that the cable 15 is extracted from the recoiler R through the movement hole A415 and connected to the mobile device A10 placed on the table, via the main hole T1.

The present invention is configured to be provided in the tabletop T so as to be capable of allowing the cable 15 to be retracted an extended, and capable of preventing twisting or breaking of the cable 15, and the present invention further includes the guide unit A30 and a roller.

To be more specific, as shown in FIGS. 1 and 2, the guide unit A30 is disposed in the insertion unit A211 that is provided within the guide housing A20, so as to allow the cable 15 to pass therethrough.

Figure 3:
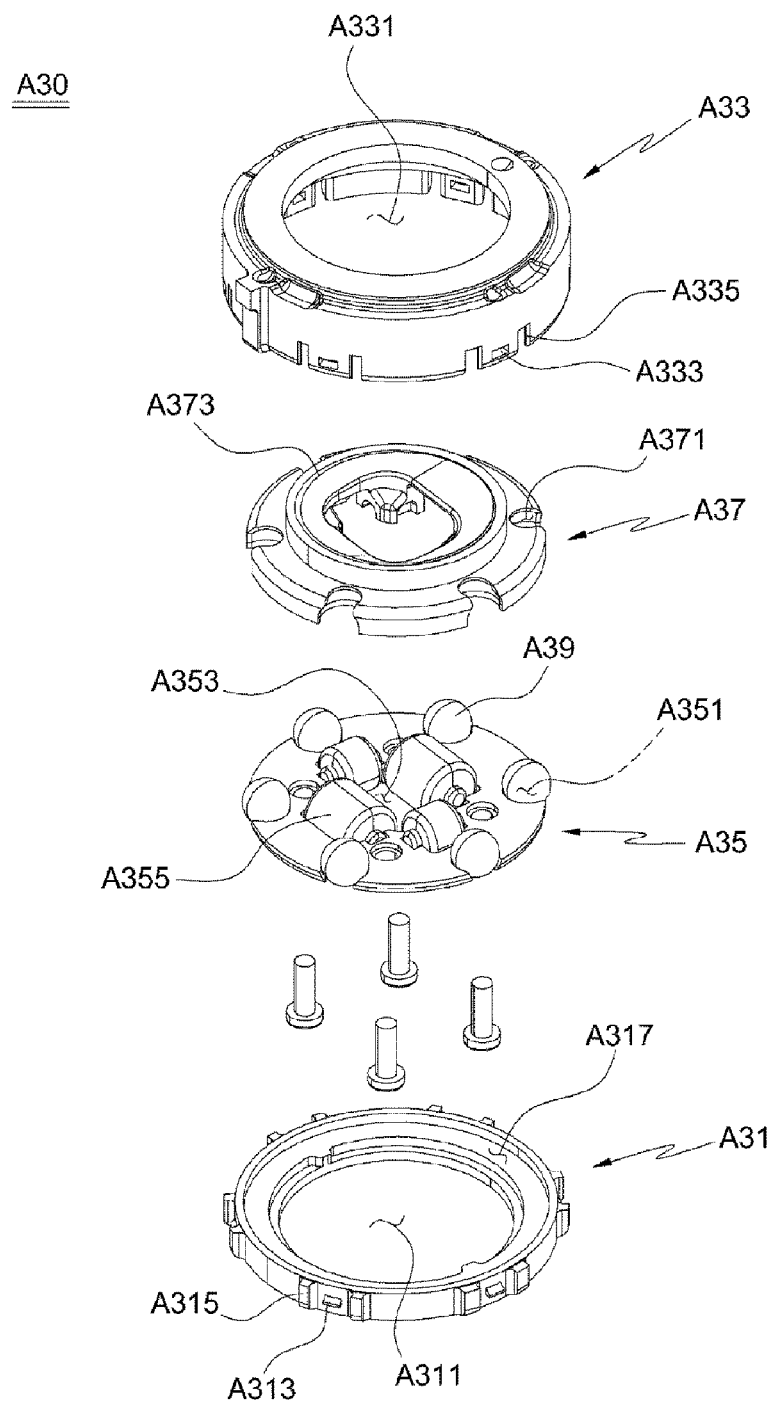
FIG. 3 is an exploded perspective view illustrating a guide housing and a guide unit according to the present invention.

FIG. 3 shows the guide unit A30 in more detail, wherein the guide unit A30 may include: a locking unit A311; a locking unit cover A33 for covering the locking unit A31; a rotor A35 provided inside the locking unit A31 and the locking unit cover A33; and a rotor cover A37 for covering the rotor A35.

To be more specific, the guide unit A30 is provided within the guide housing A20, and may include the annular locking unit A31, and the locking unit cover A33 for covering the locking unit A31.

The locking unit A31 includes: an opening A311 provided in the center thereof; and a plurality of stop protrusions A313 provided on an outer surface thereof, with a locking protrusion A315 provided on each side of each of the stop protrusions A313.

The locking unit cover A33 includes: a communicating hole A331 provided with in a center thereof, the communicating hole communicating with the opening A311; stop grooves A333 provided on an outer surface of the locking unit cover, and engaged with the stop protrusions A313; and a locking groove A335 provided on each side of each of the stop grooves A333 corresponding to the locking protrusion A315.

Thus, the locking unit A31 and the locking unit cover A33 are locked to each other by both of the stop protrusions A313 and the locking protrusion A315.

Further, the rotor A35, which is provided within a coupled body formed by coupling the locking unit A31 and the locking unit cover A33 together, is formed in a disk shape and provided with a plurality of first rotation grooves A351 on a periphery of the rotor; and the rotor cover A37 is provided with a plurality of second rotation grooves A371 corresponding to the first rotation grooves A351, and provided with an insertion protrusion A373 at a center of the rotor cover by protruding upwardly for being inserted into the communicating hole A331, wherein the rotor cover is engaged with an upper portion of the disk-shaped rotor A35 using a bolt.

Further, each pair of the first and the second rotation grooves A351 and A371, which correspond to each other, is provided with a ball bearing A39. Here, a diameter of each of the first rotation grooves A351 may be smaller than a diameter of the ball bearing A39 so as to prevent the ball bearing A39 from falling out of the first rotation grooves, thereby allowing the ball bearing to freely rotate within the first and the second rotation grooves A351 and A371, and the rotor A35 may be provided with a connection hole A353 in a center thereof for allowing the cable 15 to penetrate through the connection hole.

The rotor A35 (a coupled body of the rotor A35 and the rotor cover A37) freely rotates within the locking unit A31 (a coupled body of the locking unit A31 and the locking unit cover A33) by a rotation of the ball bearing A39. To achieve this, the locking unit A31 is provided with a seat lane A317 by protruding inwardly so as to allow the ball bearing A39, a portion of which protrudes from the bottom of the rotor A35, to be seated and moved thereon.

In other words, the cable 15 penetrates through the guide unit A30, and when the penetrated cable 15 is rotated by a user (when the cable 15 is rotated by moving the mobile device A10), the rotor A35 rotates in response to a rotation of the cable 15. Thereby, it is possible to prevent twisting of the cable 15, and is possible to allow the user to move the cable 15.

Further, when the cable 15 is retracted or extended, a frictional force is generated between the cable 15 and an associated unit depending on a degree of retraction or extension.

Thus, in order to reduce the frictional force, the present invention is configured such that at least one of the guide unit A30 and the withdrawal guide A41 is provided with the roller that rotates in response to retracting and extending of the cable 15.

As shown in FIG. 3, the connection hole A353 of the rotor A35 is provided with a plurality of first rollers A355 around the connection hole. Four first rollers A355 are provided around the connection hole A353, wherein each pair of the first rollers that face each other is same in size, but one of the first rollers and a neighboring first roller are different in size. This is because the cable 15 that is used for the present invention is not a round type cable, but a flat type cable. Thus, a size of the roller is variable depending on a contact area of the cable 15, and when the cable 15 is round type, it is preferred that all of the first rollers A355 are same in size, but due to this, the protective scope of the present invention should not be interpreted narrowly.

Further, each of the first rollers is in a cylindrical shape and provided with a coupling protrusion at opposite ends thereof; and the rotor A35 is provided with a coupling groove at a location corresponding to the coupling protrusion such that the first rollers rotate. Detailed reference on this will be skipped because a configuration of the first rollers is mentioned above.

Consequently, when the cable 15 is retracted and extended by the guide unit A30, the first rollers rotate by contacting the cable 15 in response to retracting and extending of the cable, thereby being capable of minimizing the frictional force. Further, when the cable 15 is rotated, the rotor A35 (the coupled body of the rotor A35 and the rotor cover A37) rotates by the ball bearing A39, thereby reducing the frictional force, and improving the user's convenience, and thus it is possible to prevent breaking of the cable due to the frictional force and twisting of the cable due to the rotation of the cable.

Figure 4:
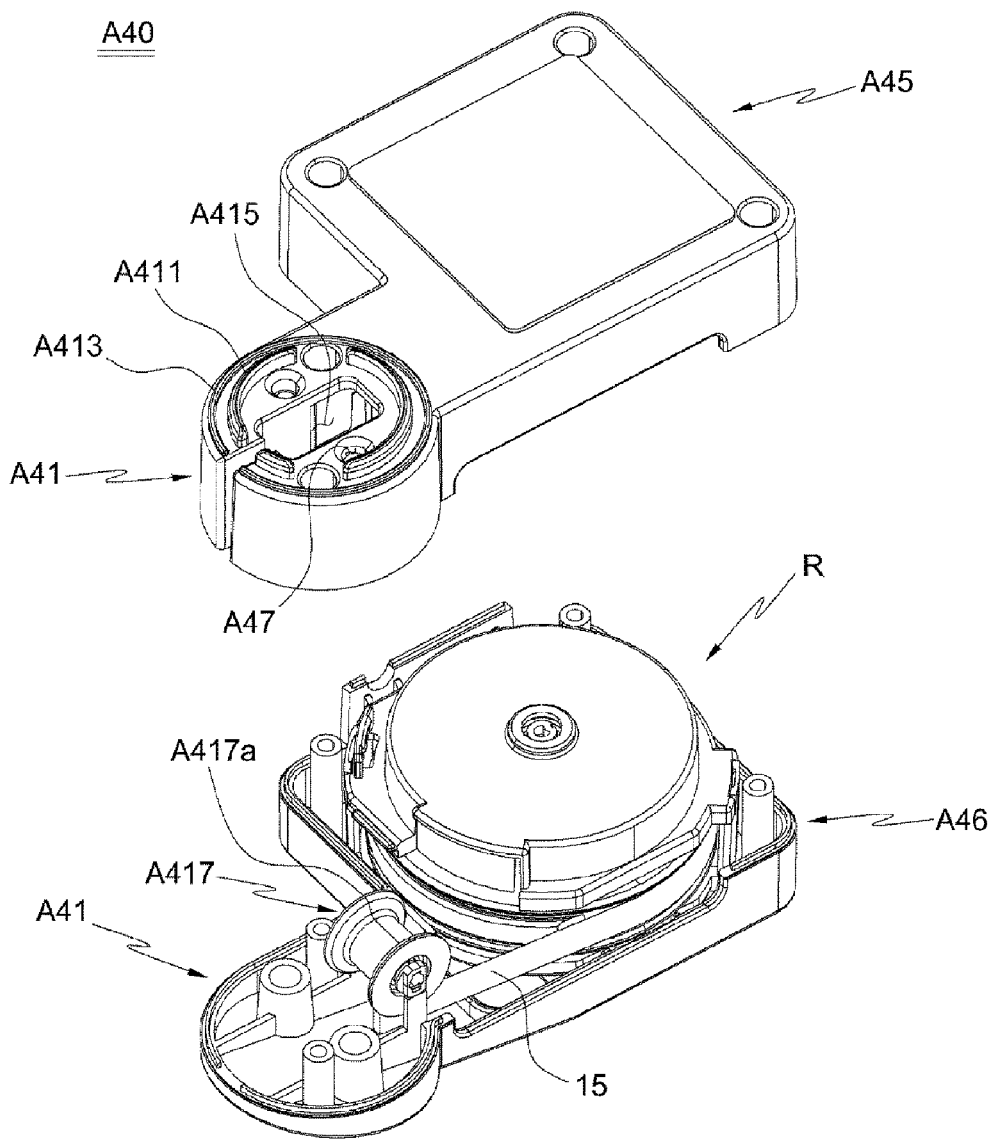
FIG. 4 is an exploded perspective view illustrating a withdrawal unit according to the present invention.

Further, as shown in FIG. 4, it is preferred that the withdrawal guide A41 provided at the lower portion of the table T is provided with a second roller A417.

Generally, an orientation of the cable 15 that is withdrawn from the recoiler R is changed to a vertical direction so as to penetrate through the table T, whereby a frictional force on a bent portion of the cable increases. Thus, to reduce the frictional force on the bent portion of the cable, the withdrawal guide A41 is provided with the second roller A417 and is configured to be rotated in response to the retraction and extension of the cable 15.

Further, the second roller A417 further includes an anti-separation panel A417a at opposite ends thereof for preventing the cable 15 from separating from the second roller, the anti-separation panel A417a has a larger diameter than a diameter of the second roller such that when the cable 15 is retracted or extended, the cable 15 is prevented from separating from the second roller.

Further, the guide housing A20 and the withdrawal unit A40 are respectively provided at the upper and the lower portion of the main hole T1 formed in the table T, and are configured to be locked by being coupled together.

However, a thickness of the table T may vary, thereby causing a problem, such as newly producing a device suitable for the thickness of the table.

Thus, to solve the above mentioned problem, the present invention is configured such that the guide housing A20 and the withdrawal unit A40 are coupled to each other by using the locking bolt A27, with a gap defined therebetween such that the guide housing and the withdrawal unit are respectively disposed at the upper portion and the lower portion of the table T.

To be more specific, the guide housing A20 includes: a first bolt hole A25; a second bolt hole A47 provided in the withdrawal guide A41 (the withdrawal guide A41 in the upper body A45) of the guide housing; and a coupling bolt for coupling the first bolt hole A25 and the second bolt hole A47 together.

Here, the guide unit A30 and the withdrawal guide A41 are provided with the gap within the main hole T1 so as not to allow the guide unit and the withdrawal guide to be entirely inserted into the main hole T1.

Thus, the guide housing A20 and the withdrawal unit A40 are respectively disposed only at the upper portion and the lower portion of the main hole T1, and a width of the gap varies depending on a thickness of the table T. The guide housing A20 and the withdrawal unit A40 are coupled to each other and locked to the table T regardless of the thickness of the table by selecting the locking bolt A27 having a length suitable for the width of the gap.

Further, the withdrawal unit A40 further includes the recoiler R for retracting and extending of the cable 15.

Figure 5:
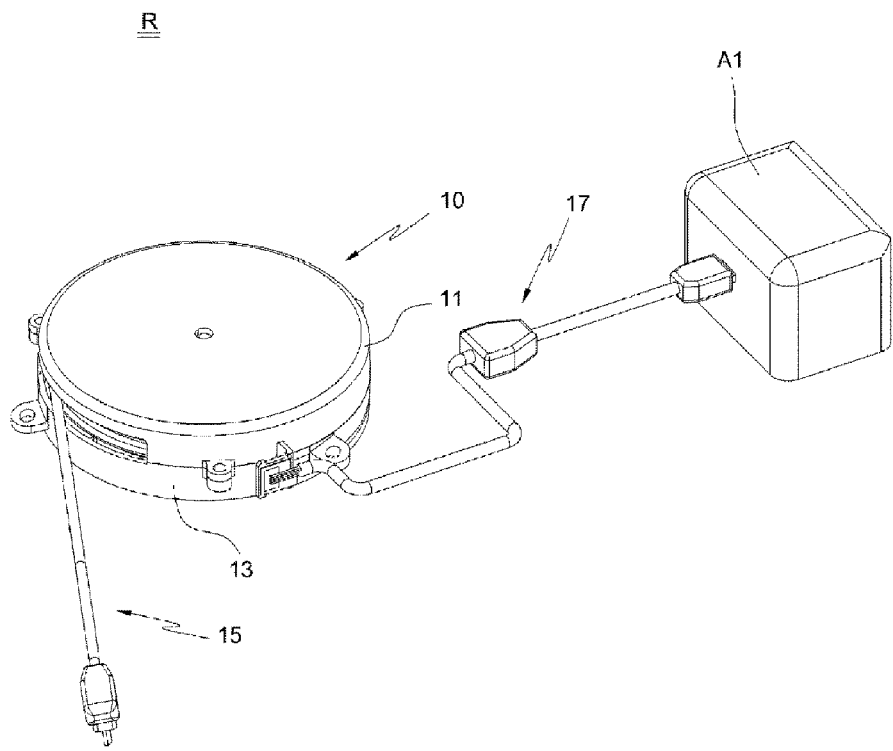
FIG. 5 is a perspective view illustrating a recoiler according to the present invention.
Figure 6:
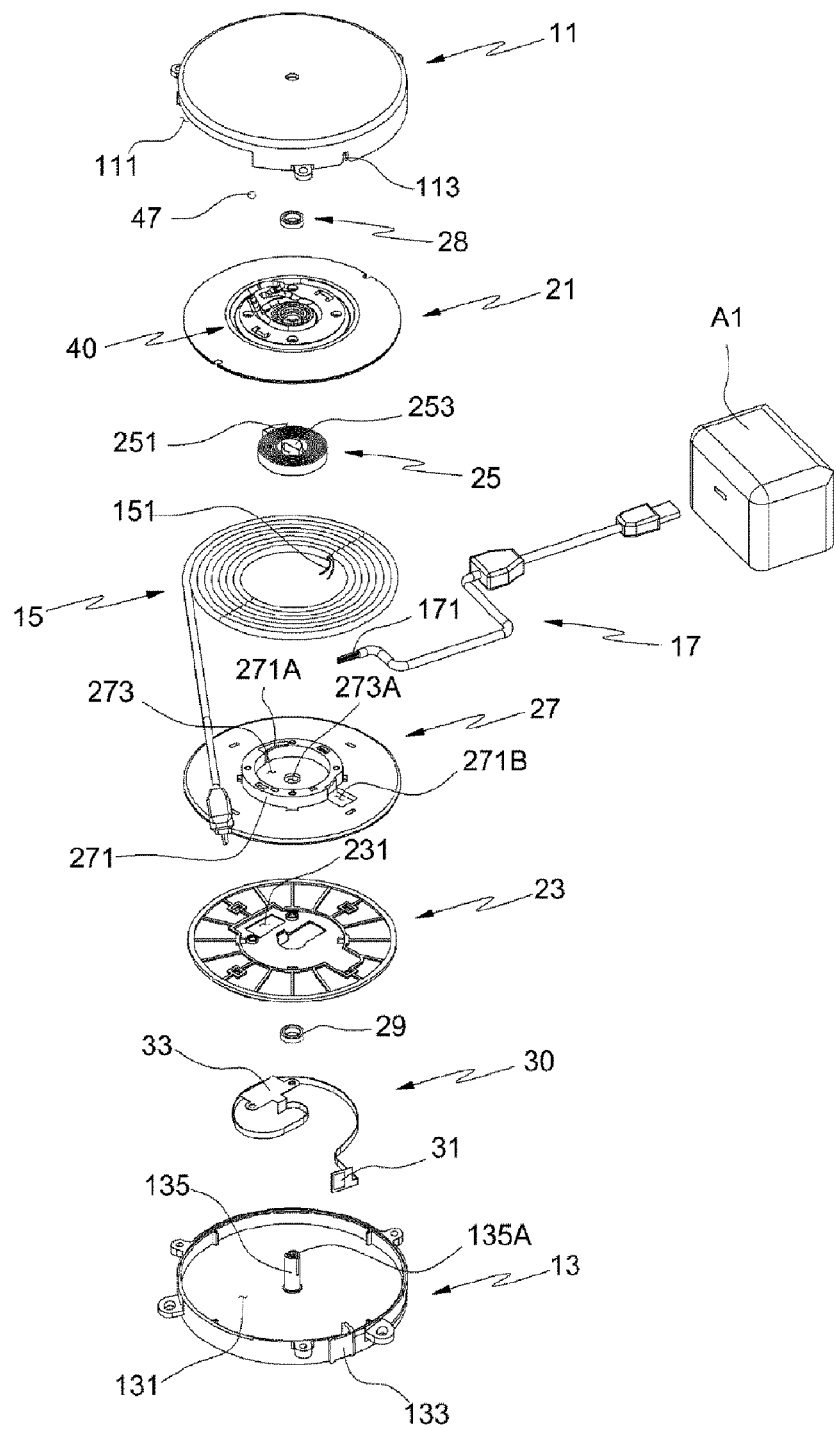
FIGS. 6 and 7 are exploded perspective views illustrating the recoiler according to the present invention.
Figure 7:
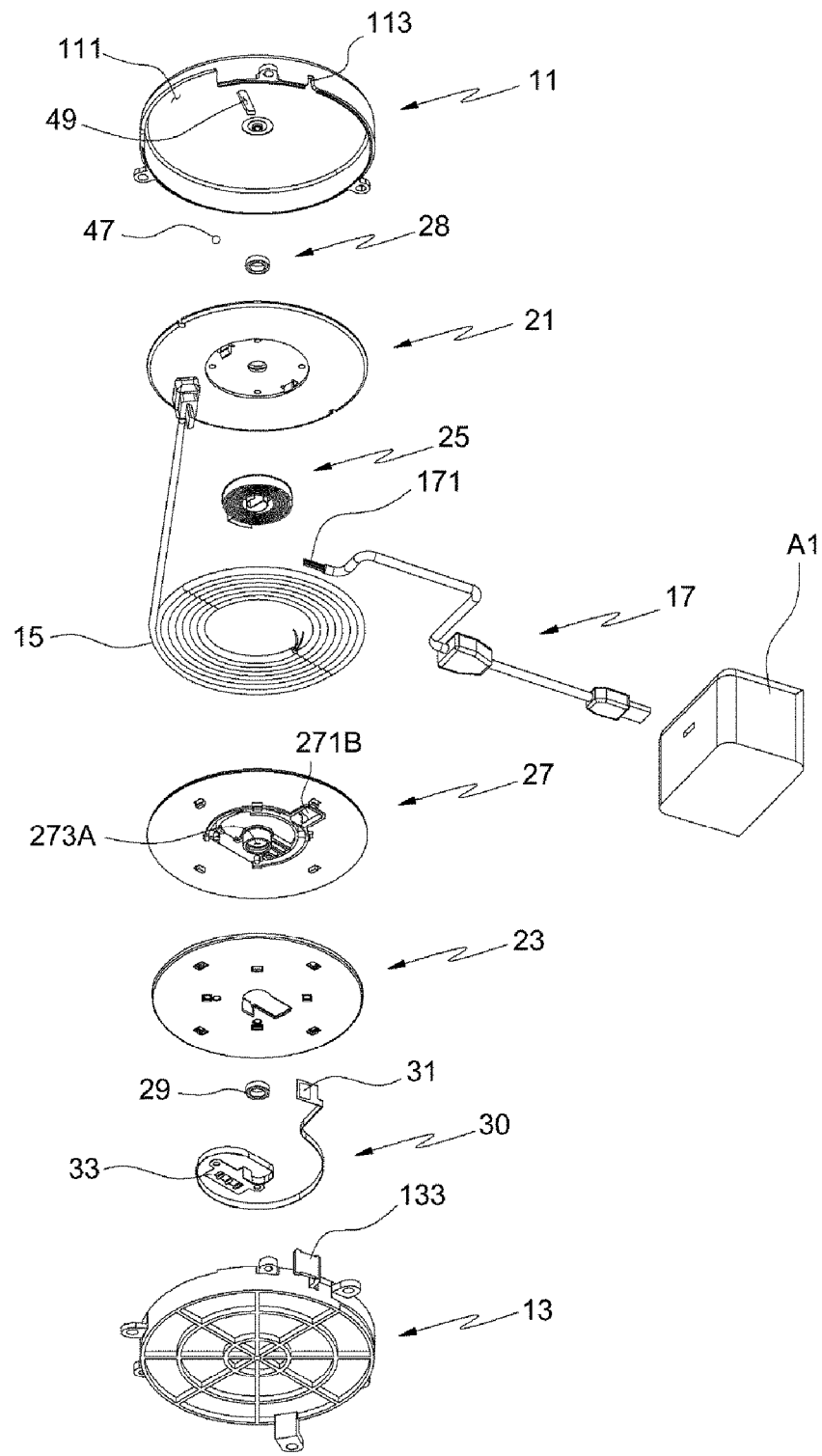

As shown in FIGS. 5 to 7, the recoiler R according to the present invention includes: a main body 10; a reel unit 20 provided in the main body 10 and being capable of winding and unwinding the cable 15; and a conducting unit 30 connecting the cable 15 and a main cable 17.

To be specific, the main body 10 is configured such that an upper main body 11 and a lower main body 13 are coupled to each other so as to have an accommodation space 131 within the main body, wherein the upper main body 11 is provided with an in/out hole 111 on an outer surface thereof such that the cable connected to a product described hereinbelow protrudes outside the main body 10, and the upper main body 11 is provided with a grounding main hole 113 on a sidewall thereof such that a first grounding unit 31 of the conducting unit 30 (FPCB: Flexible Printed Circuit Board 30) is connected to a main grounding unit 171 of the main cable 17 by protruding outside the main body 10.

Further, it is preferred that an end of the main cable 17 is configured to be connected to external power supply or an anti-theft device A1 such that an alarm sounds when the cable 15 is disconnected from the product, or power is supplied to the product by being connected to the external power supply, but due to this, the protective scope of the present invention should not be interpreted narrowly.

The lower main body 13, which is coupled to the upper main body 11, includes: a reel unit 20; the accommodation space 131 for receiving the conducting unit 30 therein; and a grounding locking member 133 provided on a sidewall of the lower main body by protruding so as to lock the first grounding unit 31 of the FPCB 30, which protrudes outside the main body via the grounding main hole 113, wherein the first grounding unit 31 and the grounding locking member 133 are locked to each other by using a conventional adhesive means (bond, glue stick, silicone, and so on).

Further, the lower main body 13 is provided with a central protrusion 135 at a center thereof by protruding such that the reel unit 20 rotates around the central protrusion 135.

The recoiler R according to the present invention is provided with a reel unit 20 capable of winding or unwinding the cable 15. To be more specific, the reel unit 20 includes: a reel 27 capable of winding or unwinding the cable 15; an upper cover 21 provided at an upper portion of the reel 27 and a lower cover 23 provided at a lower portion of the reel 27; and an elastic member 25 for giving elasticity to the reel 27, wherein the upper cover 21 and the lower cover 23 are coupled to each other, thereby forming one assembly and preventing the cable 15 from sticking out.

To be specific, the reel 27 includes: an elastic member insertion unit 273 provided at a center of the reel and receiving the elastic member 25 therein, the elastic member giving elasticity to the reel 27; and a reel protrusion 271 provided along a periphery of the elastic member insertion unit 273 by protruding upwardly such that the cable 15 is wound therearound. Further, the elastic member insertion unit 273 is provided with a through hole 273A at a center thereof for allowing the central protrusion 135 to penetrate therethrough, whereby the central protrusion 135 penetrates through a center of the elastic member 25 received in the elastic member insertion unit 273.

To be more specific, the elastic member 25 is a flat spring in a coiled shape, and is configured such that a first locking member 251 provided on an outermost surface of the elastic member is coupled with a coupling groove 271A provided on an upper surface of the reel protrusion 271. Further, a second locking member 253 disposed in a center of the coiled elastic member 25 penetrates through the through hole 273A and is coupled to a central locking groove 135A provided in the central protrusion 135 that is disposed in a center of the elastic member 25 so as to lock opposite ends of the elastic member 25. Thus, when the reel 27 rotates around the central protrusion 135, it is possible for the reel to go back to an initial position thereof by elastic force of the elastic member 25. Thereby, when the cable 15 wound around an outer circumferential surface of the reel protrusion 271 is unwound, it is possible to obtain the elastic force that allows the cable to be rewound.

Further, the reel protrusion 271 is further provided with a connector hole 271B, wherein the connector hole 271B is a through-hole for allowing a grounding terminal 151 provided at an end of the cable 15 to be connected to a second grounding unit 33 of the FPCB 30 such that the grounding terminal is connected to the second grounding unit 33 in the lower cover 23.

The reel 27 is provided with the upper cover 21 and the lower cover 23 at respectively an upper portion and a lower portion thereof, wherein the upper cover and the lower cover are coupled to each other, forming into one assembly so as to prevent separation of the cable 15 and the elastic member 25. The upper cover 21 may be further provided with a locking unit 40 at an upper portion thereof, and reference will be made in detail to the locking unit hereinbelow. The lower cover 23 is fixedly connected to the second grounding unit 33 of the FPCB 30, and is provided with a grounding connector 231 for connecting the grounding terminal 151 of the cable 15 that goes through the connector hole 271B, thereto.

To be more specific, the lower cover 23 is provided with the conducting unit 30 therebeneath, wherein the conducting unit 30 is the flexible conductor 30, and particularly is the FPCB 30. Further, the FPCB 30 is provided with the first grounding unit 31 at a first end thereof, wherein the first grounding unit is locked to the grounding locking member 133 by protruding outside via the grounding main hole 113 provided in the upper main body 11, and the locked first grounding unit 31 is connected to the main grounding unit 171 of the main cable 17. Further, the FPCB 30 is provided with the second grounding unit 33 at a second end thereof, wherein the second grounding unit 33 is disposed in the grounding connector 231 provided in the lower cover 23 so as to come into contact with the grounding terminal 151 of the cable 15, thereby allowing the main cable 17 and the cable 15 to be connected to each other.

Figure 8A:
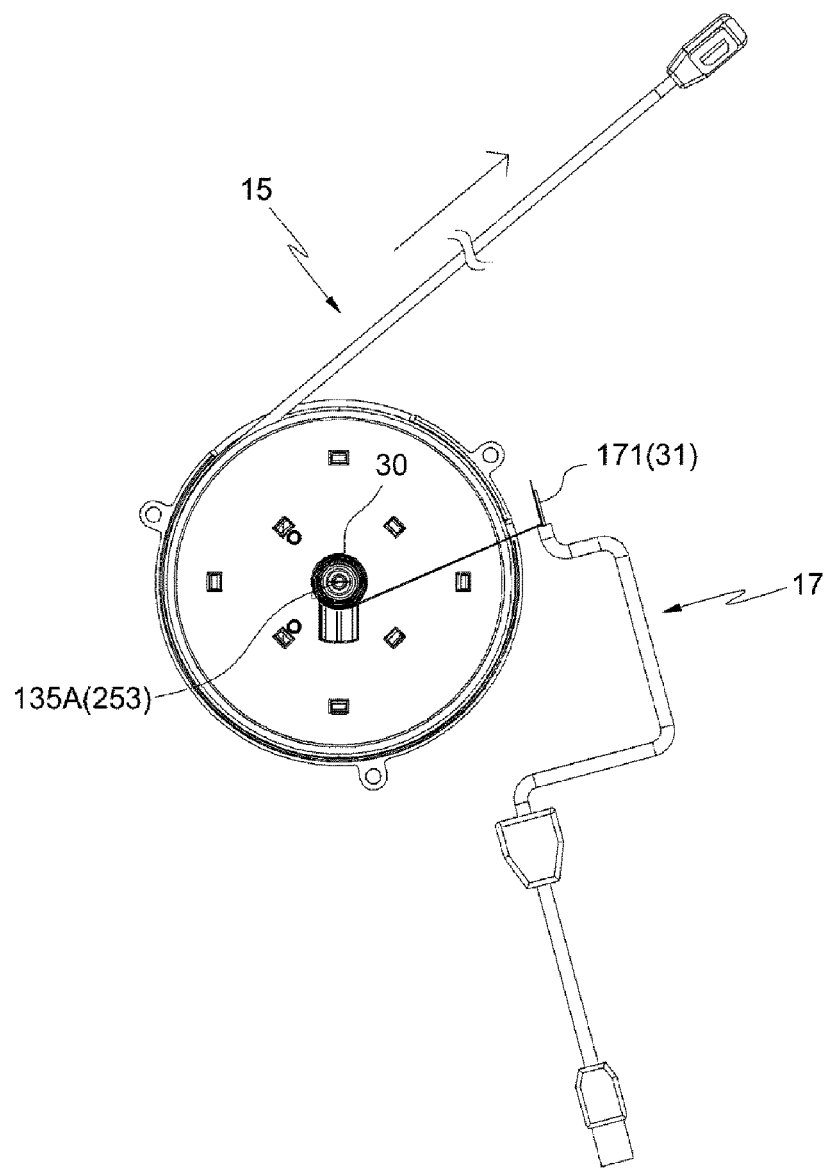
FIGS. 8A, 8B, 9A, 9B, and 9C are views illustrating operation of the recoiler according to the present invention.
Figure 8B:
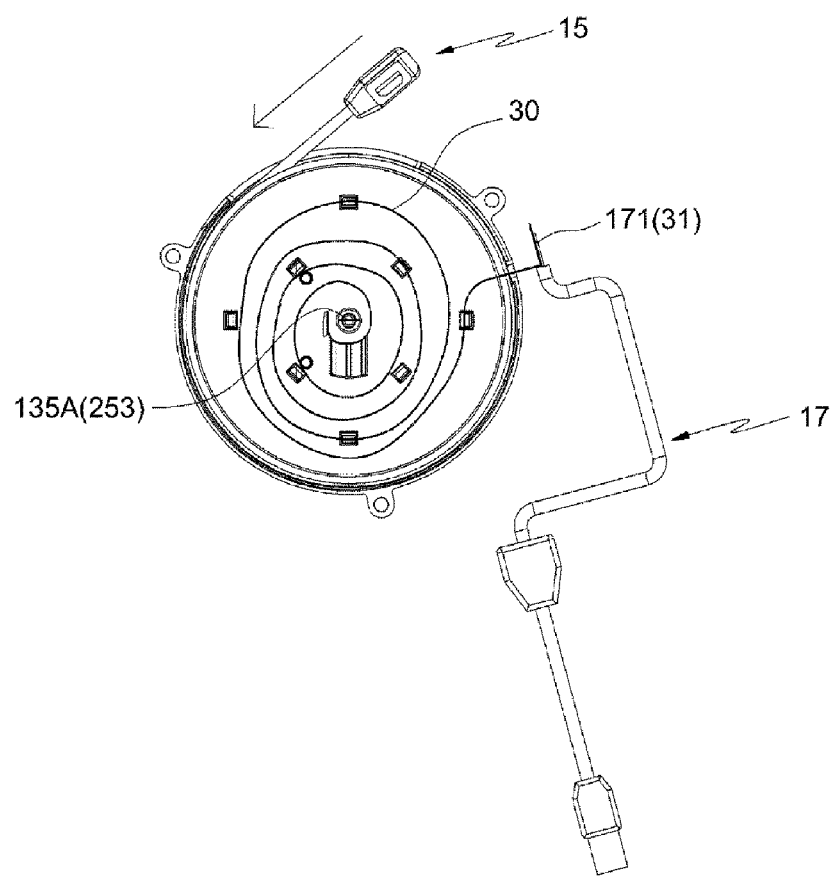

FIGS. 8A and 8B are views illustrating use of the FPCB 30. As shown in FIG. 8A, when the cable 15 is unwound, the upper cover 21, the lower cover 23, and the reel 27 rotate, whereby the FPCB 30 is reeled in the central protrusion 135 by both the second grounding unit 33 locked to the lower cover 23 and the first grounding unit 31 provided in the lower main body 13. Further, as shown in FIG. 8B, when the cable 15 is wound by the elastic member 25, the FPCB 30 is loosened by being reeled out from the central protrusion 135, whereby regardless of the cable 15 being wound or unwound, the main cable 17 remains connected to the cable 15, and it is possible to prevent breaking of the cable by using the FPCB 30.

Further, an upper portion of the upper cover 21 and a lower portion of the lower cover 23 are respectively provided with a first bearing 28 and a second bearing 29 for being coupled to the central protrusion 135, thereby allowing the assembly (the assembly including the upper cover 21, the reel 27, and the lower cover 23) to smoothly rotate around the central protrusion 135 within the accommodation space 131 in the main body 10.

When a user examines a connected product, the cable 15 is unwound. Here, the force allowing the cable to be rewound is exerted by the elastic force of the elastic member 25, thereby causing inconvenience to the user. For this reason, a means for keeping the cable 15 loose is required. Thus, the recoiler R according to the present invention further includes the locking unit 40, wherein the locking unit 40 includes a locking ball 47, a movement track 41 for allowing the locking ball 47 to travel thereon, and a seating track 43 for seating the locking ball 47 therein.

Figure 9A:
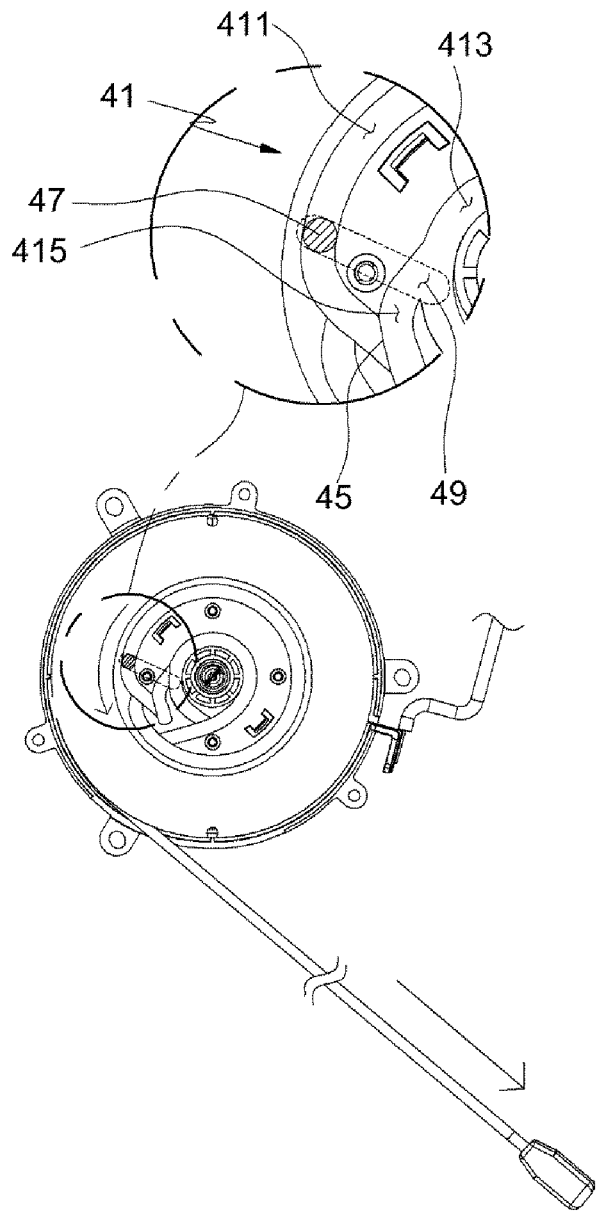
Figure 9B:
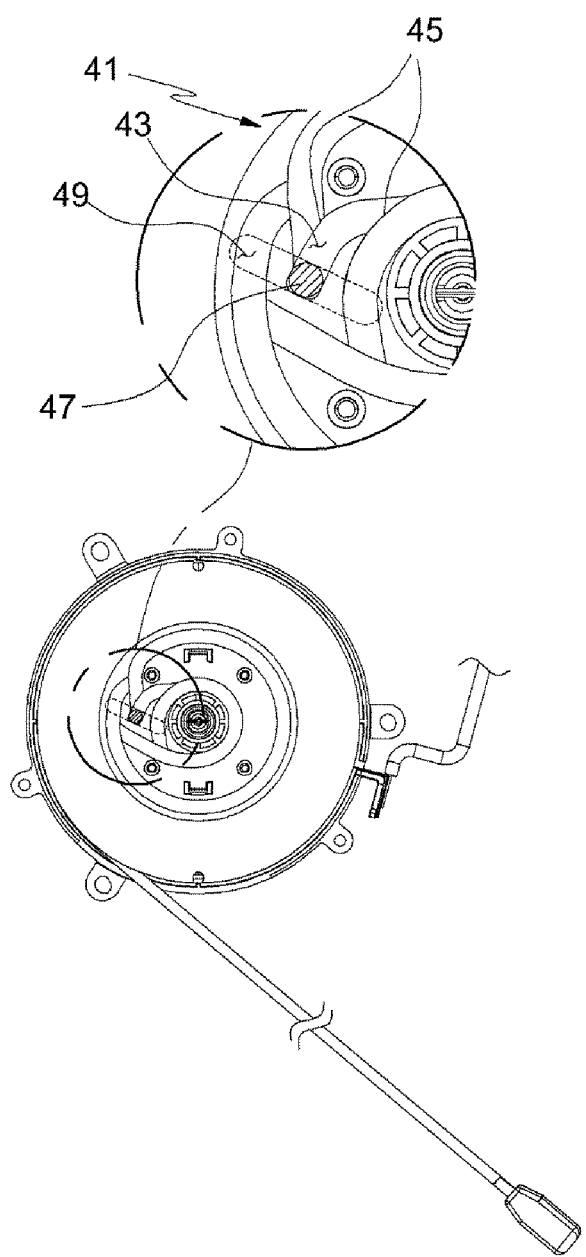
Figure 9C:
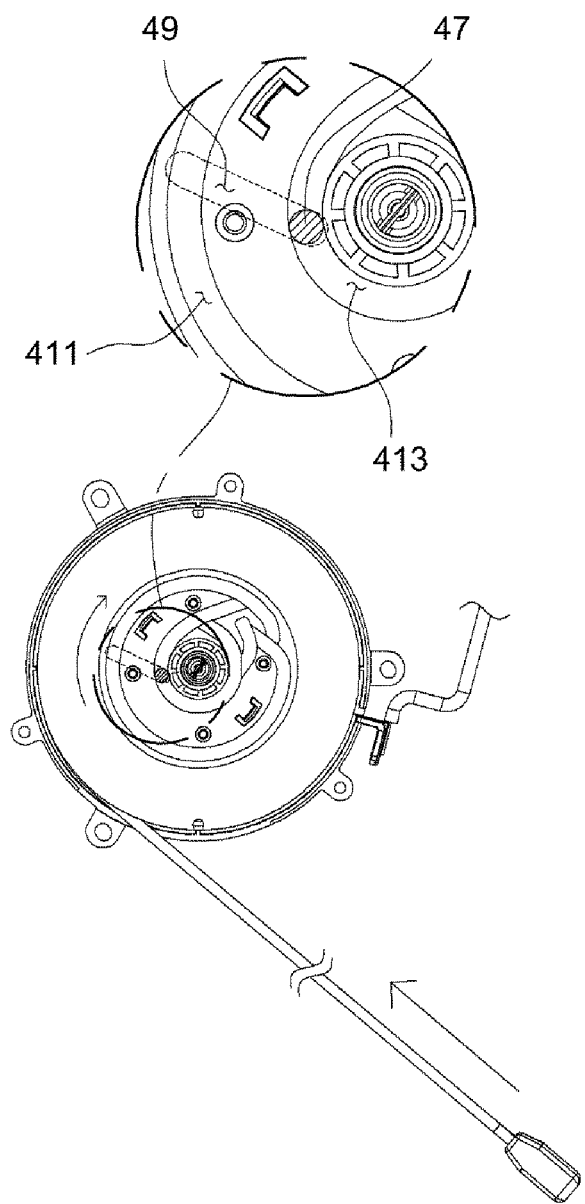

To be specific, as shown in FIGS. 9A, 9B, and 9C, the upper portion of the upper cover 21 is provided with the locking ball 47 and the movement track 41 for allowing the locking ball 47 to travel thereon. The movement track 41 includes: a winding track 411 for allowing the locking ball 47 to travel thereon when the cable 15 is wound; an unwinding track 413 provided on a periphery of the winding track 411 for allowing the locking ball 47 to travel thereon when the cable 15 is unwound; and a communicating track 415 for allowing the locking ball 47 to travel on the winding track 411 and the unwinding track 413 by connecting the winding track 411 and the unwinding track 413 together.

To be more specific, the locking ball 47 is configured to be capable of travelling on the winding track 411 and the movement track 41 alternately along a movement groove 49 provided in an inner surface of the upper main body 11; and configured such that when the cable 15 is unwound, the locking ball 47 located on the winding track 411 moves to the unwinding track 413 provided on the periphery of the winding track 411 along the communicating track 415, by a rotation of the upper cover 21, and rotates along the unwinding track 413. Here, when the cable 15 that is being unwound is released, the locking ball 47 moves to an inner portion of the unwinding track 413 along the communicating track 415 provided in the unwinding track 413. Here, the locking ball 47 is seated in the seating track 43 provided at a side of the communicating track 415, thereby locking the cable 15.

Then, when the cable 15 is unwound a little bit in order to wind the cable 15, the locking ball 47 seated in the seating track 43 moves to the communicating track 415 configured to face an inner side of the winding track 411, and is located on the winding track 411. As the locking ball 47 moves along the winding track 411, the cable 15 is smoothly retracted.

Here, in a process where the locking ball 47 unwinds and winds the cable 15, a ridge 45 is provided at each junction of the tracks such that the locking ball easily travels from the winding track 411, to the unwinding track 413, to and from the seating track 43, and to the winding track 411, whereby a travel route of the locking ball 47 is restricted. Thus, it is possible to easily wind, unwind, and stop the cable 15.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A cable retraction unit assembly comprising:
a cable (15) connected to a mobile device (A10);
a guide housing (A20) mounted to an upper portion of a main hole (T1) provided in a tabletop (T), with the cable (15) penetrating through the guide housing;
a guide unit (A30) provided within the guide housing (A20) for passing the cable (15) therethrough, the guide unit being configured to rotate in response to a rotating direction of the cable (15); and
a withdrawal unit (A40) provided at a lower portion of the main hole (T1), the withdrawal unit including a withdrawal guide (A41) for inducing retracting and extending of the cable (15) and a recoiler (R) connected to the withdrawal guide (A41) so as to wind the cable (15),
wherein at least one of the guide unit (A30) and the withdrawal guide (A41) is provided with a roller that rotates in response to retracting and extending of the cable (15), and
wherein the guide unit (A30) includes: a locking unit (A31); a rotor (A35) provided within the locking unit (A31); and a plurality of ball bearings (A39) provided in the rotor (A35) plural and inducing a rotation of the rotor (A35) in the locking unit (A31).

2. A cable retraction unit assembly comprising:
a cable (15) connected to a mobile device (A10);
a guide housing (A20) mounted to an upper portion of a main hole (T1) provided in a tabletop (T), with the cable (15) penetrating through the guide housing;
a guide unit (A30) provided within the guide housing (A20) for passing the cable (15) therethrough, the guide unit being configured to rotate in response to a rotating direction of the cable (15); and
a withdrawal unit (A40) provided at a lower portion of the main hole (T1), the withdrawal unit including a withdrawal guide (A41) for inducing retracting and extending of the cable (15) and a recoiler (R) connected to the withdrawal guide (A41) so as to wind the cable (15),
wherein the guide housing (A20) and the withdrawal unit (A40) are coupled to each other by using a locking bolt (A27), with a gap defined therebetween such that the guide housing and the withdrawal unit are respectively disposed at an upper portion and a lower portion of the tabletop, and
wherein the guide unit (A30) includes: a locking unit (A31); a rotor (A35) provided within the locking unit (A31); and a plurality of ball bearings (A39) provided in the rotor (A35) plural and inducing a rotation of the rotor (A35) in the locking unit (A31).

* * * * *